United States Patent
Markovsky et al.

(10) Patent No.: US 10,623,722 B2
(45) Date of Patent: Apr. 14, 2020

(54) HEAD-UP MULTIPLEX DISPLAY WITH REDIRECTION OPTIC

(71) Applicant: Microsoft Technology Licensing, LLC, Redmond, WA (US)

(72) Inventors: Igor Markovsky, Redwood City, CA (US); Michael Nikkhoo, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 107 days.

(21) Appl. No.: 15/154,809

(22) Filed: May 13, 2016

(65) Prior Publication Data

US 2017/0332070 A1 Nov. 16, 2017

(51) Int. Cl.
*H04N 13/341* (2018.01)
*G02B 27/01* (2006.01)

(52) U.S. Cl.
CPC ......... *H04N 13/341* (2018.05); *G02B 27/017* (2013.01); *G02B 27/0172* (2013.01);
(Continued)

(58) Field of Classification Search
CPC ........ G02B 5/30; G02B 17/0856; G02B 5/32; G02B 5/203; G02B 27/0101;
(Continued)

(56) References Cited

U.S. PATENT DOCUMENTS 4,383,740 A * 5/1983 Bordovsky ........ G02B 27/0101
348/121
4,961,625 A 10/1990 Wood et al.
(Continued)

FOREIGN PATENT DOCUMENTS

WO 2009015375 A1 1/2009

OTHER PUBLICATIONS

"Navdy", Published on: Aug. 5, 2014. Available at: https://www.navdy.com/#video.
(Continued)

*Primary Examiner* — Jennifer Mehmood
*Assistant Examiner* — James S Nokham
(74) *Attorney, Agent, or Firm* — Alleman Hall Creasman & Tuttle LLP

(57) ABSTRACT

A head-up display system comprises a microprojector, first and second viewer optics, a redirection optic, and an electronic controller. Switchable electronically between first and second optical states, the redirection optic is configured to receive a display image from the microprojector, to convey the display image, in the first optical state, to the first viewer optic, and to convey the display image, in the second optical state, to the second viewer optic. The electronic controller is configured to, during a first interval, switch and maintain the redirection optic in the first optical state and cause the microprojector to form the display image based on first image data. The electronic controller is further configured to, during a second interval, switch and maintain the redirection optic in the second optical state and cause the microprojector to form the display image based on second image data.

20 Claims, 3 Drawing Sheets

(52) U.S. Cl.
CPC ............. *G02B 2027/0134* (2013.01); *G02B 2027/0136* (2013.01); *G02B 2027/0178* (2013.01)

(58) Field of Classification Search
CPC .................. G02B 27/0172; G02B 27/017; B02B 6/0028; G02G 17/0856
See application file for complete search history.

(56) References Cited

U.S. PATENT DOCUMENTS

| | | | |
|---|---|---|---|
| 5,278,696 A | 1/1994 | Suvada | |
| 5,418,584 A | 5/1995 | Larson | |
| 5,808,589 A * | 9/1998 | Fergason | G02B 27/0172 345/8 |
| 5,907,416 A | 5/1999 | Hegg et al. | |
| 6,239,908 B1 | 5/2001 | Kelly et al. | |
| 6,844,980 B2 | 1/2005 | He et al. | |
| 7,733,572 B1 * | 6/2010 | Brown | G02B 17/0856 359/630 |
| 7,777,960 B2 | 8/2010 | Freeman | |
| 8,277,055 B2 | 10/2012 | Kuhlman et al. | |
| 2003/0122732 A1 * | 7/2003 | Shaw | G02B 27/017 345/7 |
| 2004/0150884 A1 * | 8/2004 | Domjan | G02B 27/0172 359/462 |
| 2006/0132914 A1 * | 6/2006 | Weiss | G02B 5/32 359/462 |
| 2006/0232853 A1 | 10/2006 | Dobschal et al. | |
| 2007/0188837 A1 * | 8/2007 | Shimizu | G02B 5/203 359/13 |
| 2010/0177025 A1 * | 7/2010 | Nagata | G02B 6/0028 345/76 |
| 2011/0057862 A1 * | 3/2011 | Chen | G02B 27/017 345/3.1 |
| 2012/0050044 A1 | 3/2012 | Border et al. | |
| 2013/0033756 A1 * | 2/2013 | Spitzer | G02B 27/0172 359/630 |
| 2013/0258461 A1 * | 10/2013 | Sato | G02B 27/01 359/464 |
| 2013/0286047 A1 * | 10/2013 | Katano | G02B 27/0101 345/633 |
| 2014/0267978 A1 | 9/2014 | Guthrie | |
| 2014/0327601 A1 * | 11/2014 | Tilleman | G02B 5/30 345/7 |
| 2015/0061976 A1 | 3/2015 | Ferri | |
| 2015/0212326 A1 * | 7/2015 | Kress | G02F 1/29 349/11 |
| 2015/0260992 A1 * | 9/2015 | Luttmann | G02B 27/0172 359/631 |
| 2016/0041394 A1 * | 2/2016 | Tanaka | G02B 27/0172 359/630 |

OTHER PUBLICATIONS

"International Search Report and Written Opinion Issued in PCT Application No. PCT/US2017/031458", dated Aug. 3, 2017, 10 Pages. (MS# 359477-WO-PCT).

* cited by examiner

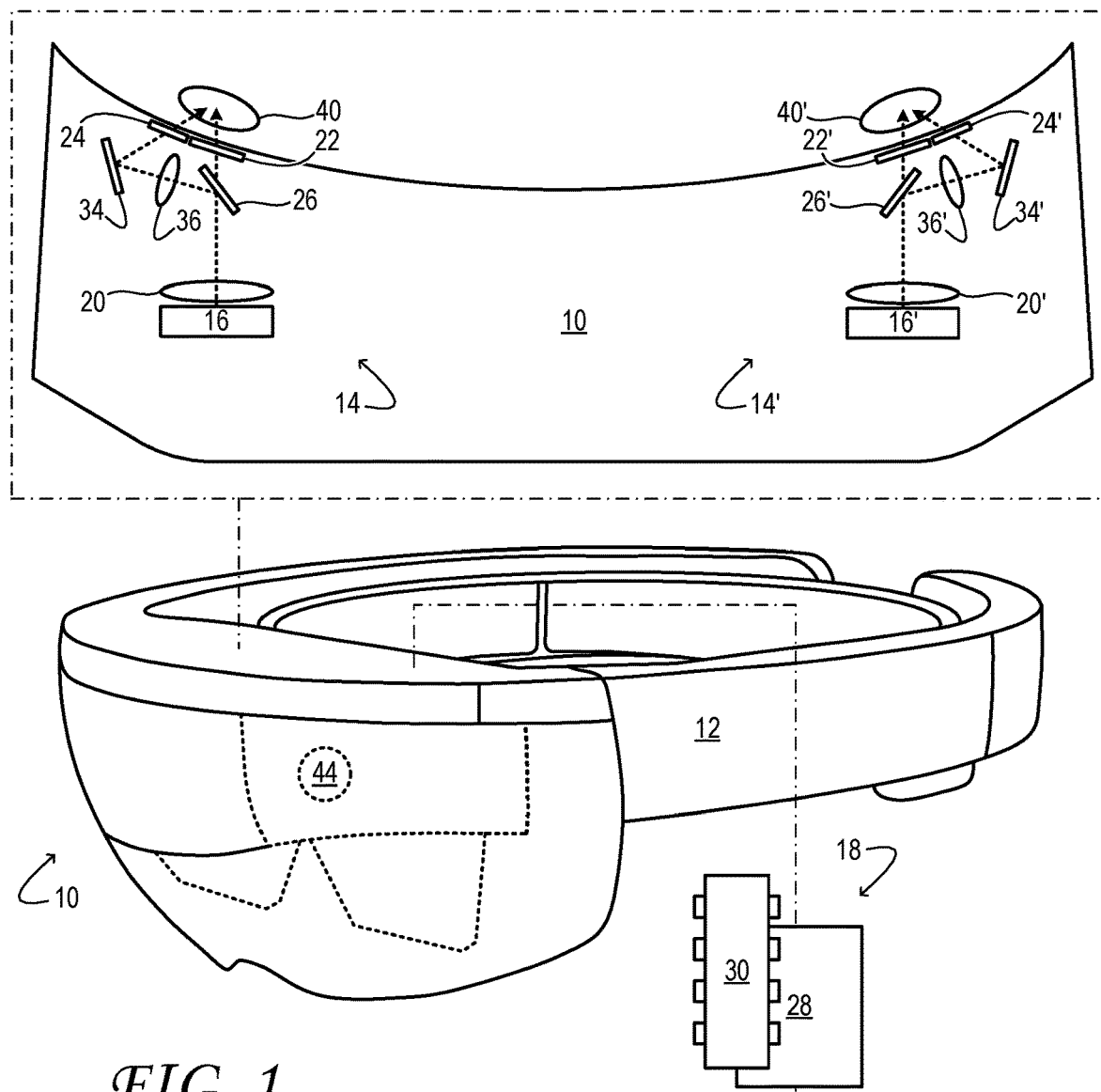
FIG. 1
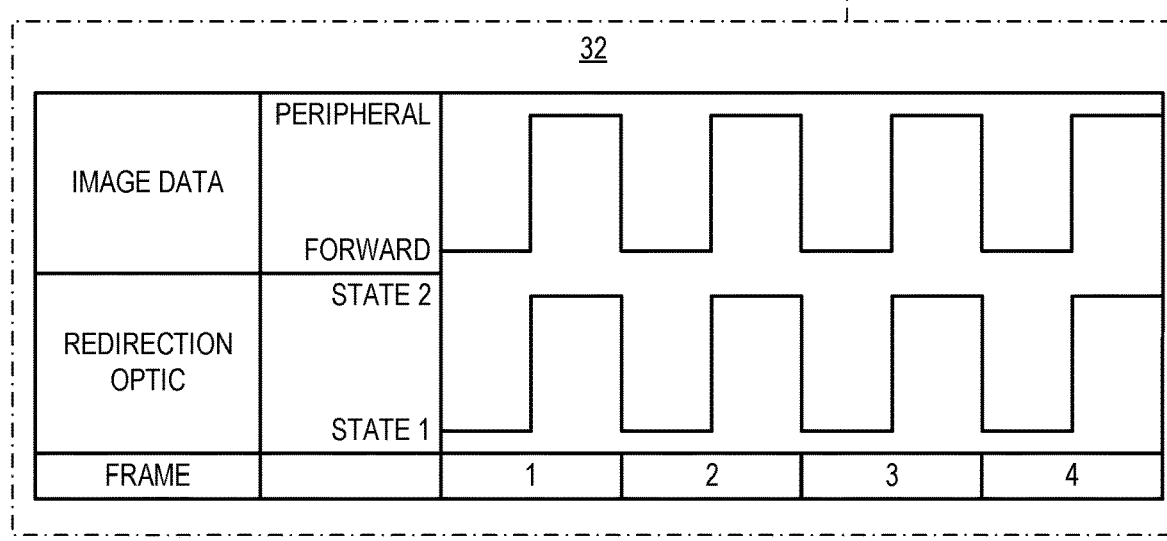

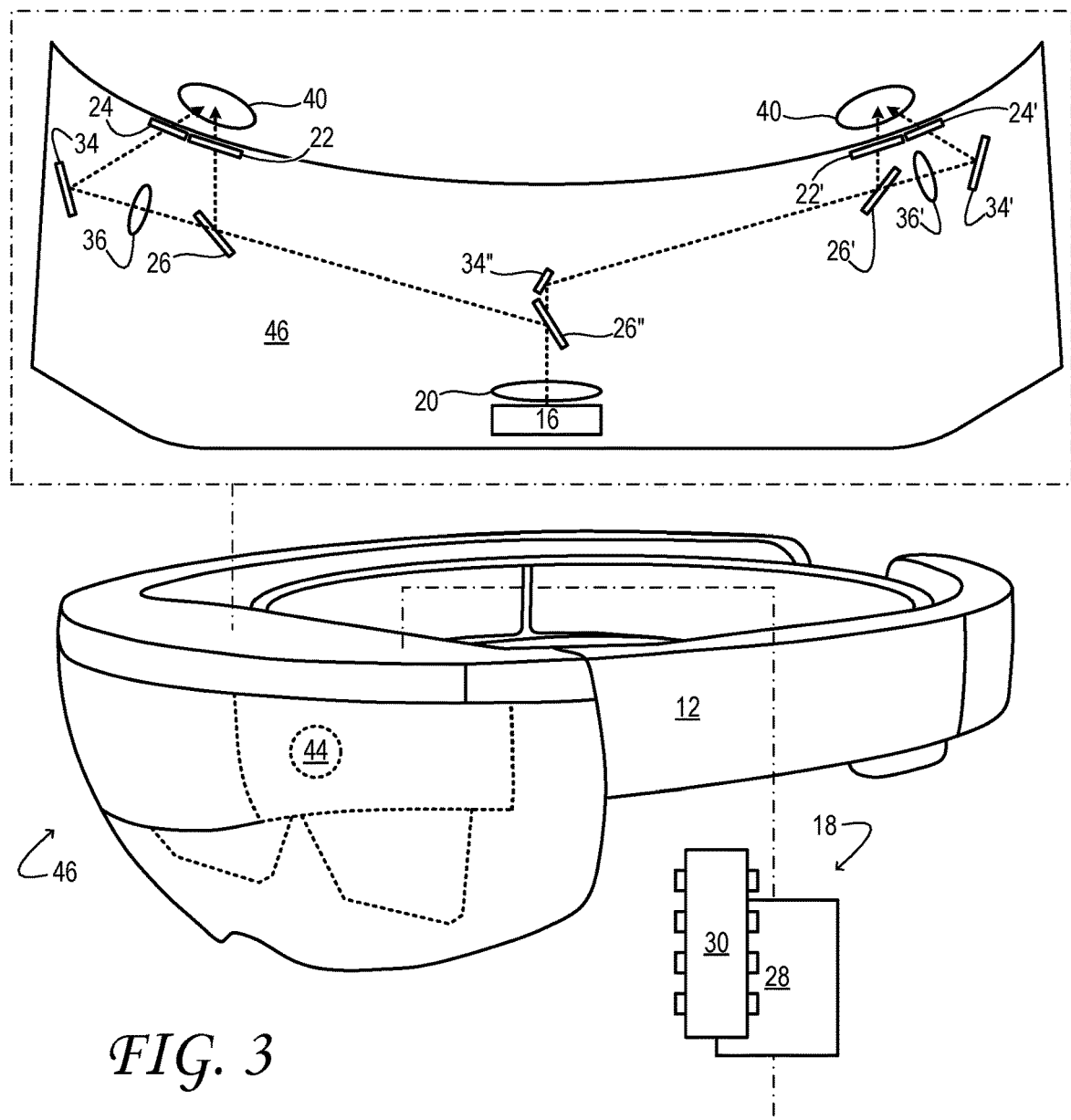
FIG. 3
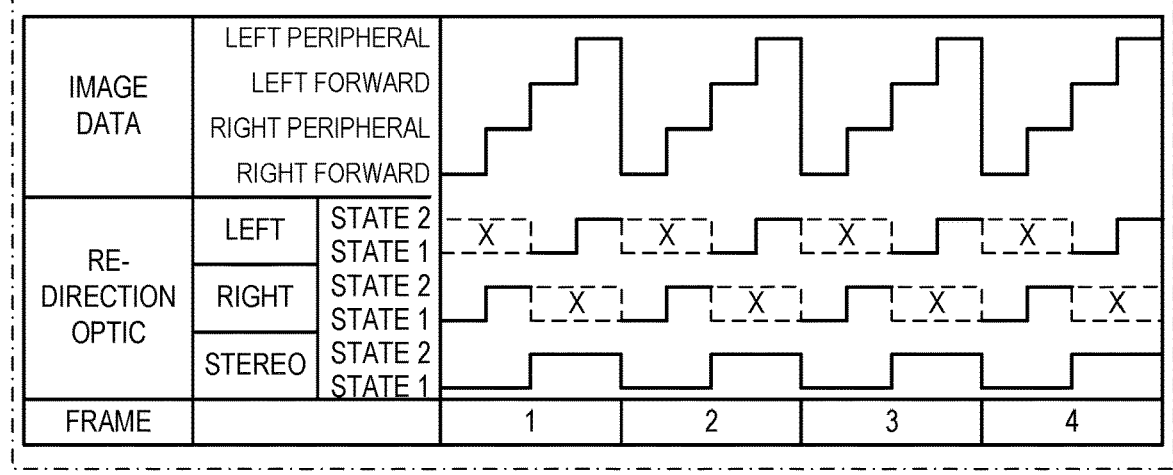

HEAD-UP MULTIPLEX DISPLAY WITH REDIRECTION OPTIC

BACKGROUND

Head-up display technology has progressed rapidly in recent years. Compact, fixed-reference head-up display systems are now installed in automobiles. Virtual-reality (VR) and mixed-reality (MR) goggles for the consumer market are also available. Nevertheless, various impediments to user-friendly head-up display technology remain. One challenge relates to the increased size, weight, cost and power consumption of redundant optical componentry in a fixed-reference head-up display system or wearable display device.

SUMMARY

One embodiment provides a head-up display system. The display system comprises a microprojector, first and second viewer optics, a redirection optic, and an electronic controller. Switchable electronically between first and second optical states, the redirection optic is configured to receive a display image from the microprojector, to convey the display image, in the first optical state, to the first viewer optic, and to convey the display image, in the second optical state, to the second viewer optic. The electronic controller is configured to, during a first interval, switch and maintain the redirection optic in the first optical state and cause the microprojector to form the display image based on first image data. The electronic controller is further configured to, during a second interval, switch and maintain the redirection optic in the second optical state and cause the microprojector to form the display image based on second image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

BRIEF DESCRIPTION OF THE DRAWINGS

FIG. 1 shows aspects of an example head-up display system offering an extended field-of-view.

FIG. 3 shows aspects of an example head-up display system offering stereoscopic image display, and an extended field-of-view, using a single microprojector.

DETAILED DESCRIPTION

Figure 2:
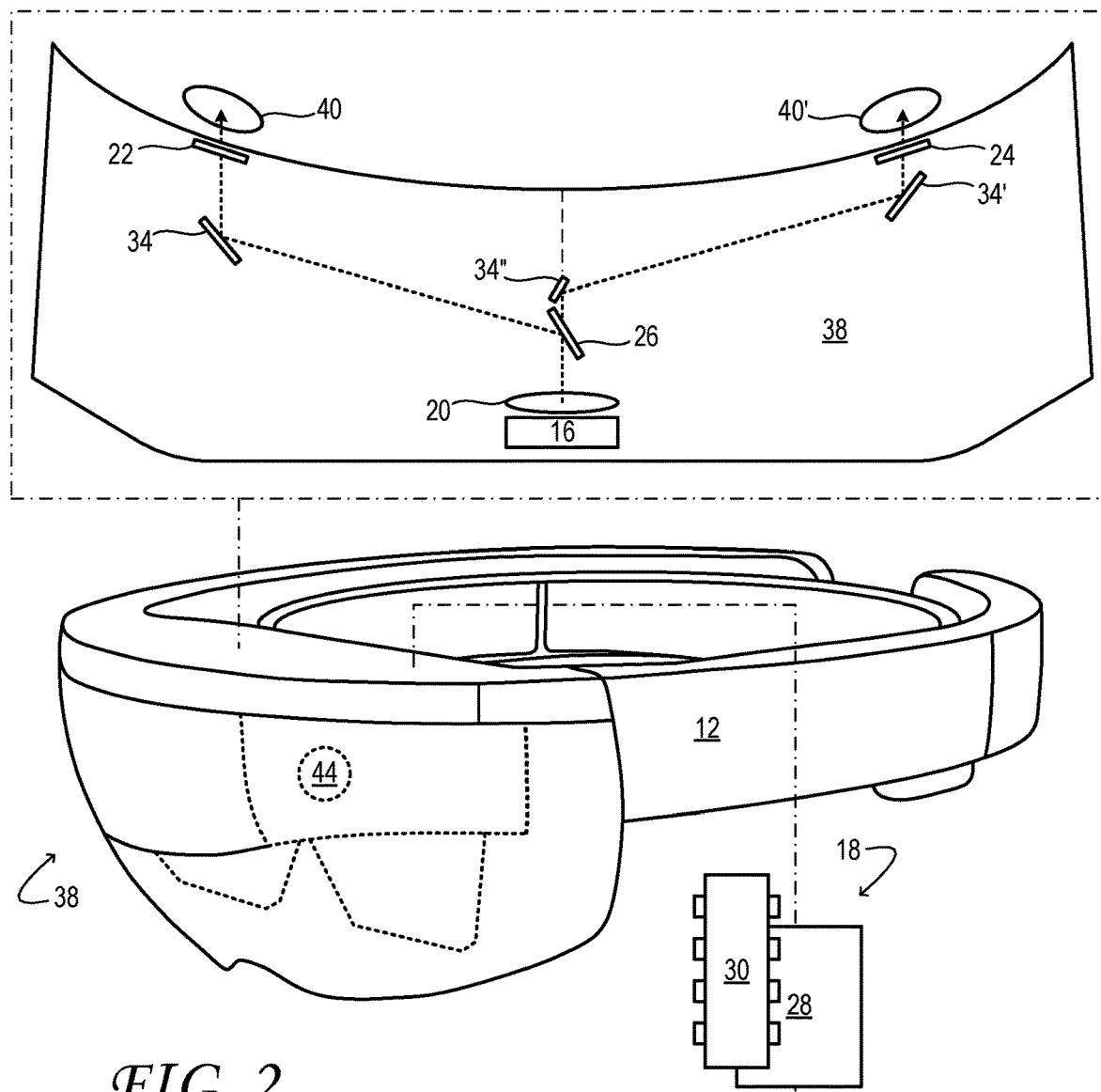
FIG. 2 shows aspects of an example head-up display system offering stereoscopic image display using a single microprojector.

Head-up display systems direct virtual imagery into a user's field-of-view using various projection schemes. For example, a display image may be generated by a microprojector, focused, and expanded into the field-of-view. For applications in which imagery is projected into multiple or extended fields-of-view, one approach is to provide multiple, discrete microprojectors, each servicing one field-of-view or one portion thereof. Examples include stereoscopic, near-eye display devices and fixed-reference head-up display systems, and systems that direct imagery to forward and peripheral fields of view. A significant disadvantage of this approach is the increased size, weight, cost, and power consumption of redundant microprojectors and associated optical componentry. Another disadvantage, for wearable, stereoscopic display devices especially, is the need for precise relative alignment of two, independent optical systems, in order to provide convincing 3D display and prevent eyestrain.

The approach set forth in this disclosure addresses the above issues by operating a microprojector in multiplex. The microprojector is configured to project, in sequence, display images composed separately for the different fields-of-view. Synchronously, a switchable redirection optic directs each display image to the appropriate field-of-view. This approach reduces the number of microprojectors required for a given display application, simplifies alignment in stereoscopic near-eye displays, and secures yet other advantages.

Aspects of this disclosure are now described by example, and with reference to the attached drawing figures. Components, process steps, and other elements that may be substantially the same in one or more of the figures identified coordinately and are described with minimal repetition. It will be noted, however, that elements identified coordinately may also differ to some degree. It will be further noted that the figures are schematic not necessarily drawn to scale. Rather, the various drawing scales, aspect ratios, and numbers of components shown in the figures may be purposely distorted to make certain features or relationships easier to see.

FIG. 1 shows aspects of an example wearable, near-eye, head-up display system 10. Display system 10 includes a band 12 to be worn on the user's head, and two, complementary display subsystems—a right-eye subsystem 14 and a left-eye subsystem 14'.

Display system 10 includes microprojector 16. The microprojector is configured to form a display image based on display-image data provided to the microprojector. The display-image data may take the form of a sequence of numeric values corresponding each to the brightness of an individual pixel of the display image. In color-display implementations, three different numeric values—corresponding to brightness in red, green, and blue color channels, for example—may be provided for each pixel. In video-display implementations, the display-image data may be time-resolved. In these and other embodiments, display-image data may be provided via electronic controller 18 of the display system, as described further below.

The nature of microprojector 16 may differ in the different implementations of this disclosure. In some implementations, the microprojector may be a liquid crystal display (LCD) projector having a backlight and a matrix of individually controllable light valves registered to color-filter array elements. In some implementations, the microprojector may be a liquid-crystal-on-silicon (LCOS) projector in which the matrix of light valves is arranged on a reflective substrate. In some implementations, the microprojector may use coherent light sources and a spatial light modulator (SLM) in lieu of light valves. In some implementations, the microprojector may be a digital light processing (DLP) projector incorporating a micromirror array illuminated by one or more narrow-band (e.g., red, green, blue) light sources. In some implementations, the microprojector may be a scanned-beam system or an organic light-emitting diode (OLED) projector. These and other microprojection technologies are envisaged herein.

Adapted for head-up display system 10, microprojector 16 is configured to form a virtual display image that is directed into the user's field-of-view. The virtual display image may reference a focal plane positioned 'at infinity' or at any finite distance in front of the user. To this end, the microprojector includes a focusing lens 20, which sets the distance to the focal plane.

Continuing in FIG. 1, display system 10 includes a first viewer optic 22 and a second viewer optic 24. In near-eye implementations, each of the first and second viewer optics may be an eyepiece optic positioned close to an eye of the user. Each viewer optic is configured to receive the display image formed by microprojector 16. In some implementations, each viewer optic is a pupil-expansion optic, which divides every incident ray into a series of parallel rays distributed over a larger area. An appropriately configured pupil-expansion optic prevents vignetting of the display image in the user's field-of-view and makes the display image viewable over a range of pupil positions. In one implementation, a pupil-expanding viewer optic may include a waveguide coupled to a turning film having periodic, partially reflective facets. In some implementations, the facets may be reflective over a limited range of angles, corresponding to the angular range of the light propagating through the waveguide. Outside this range of angles, the facets may be substantially transparent. This feature allows real imagery external to display system 10 to reach the user's eye, thereby enabling a 'mixed-reality' experience in which real and virtual imagery is admixed into the user's field of view. Mixed-reality display is also achievable using a free-space combiner solution having a separate eyebox for each of the right and left eyes. Each eyebox may include, for example, a partially silvered mirror. Despite the advantages of mixed-reality display, the first and second viewer optics need not be transparent in every embodiment. For an immersive 'virtual reality' experience, the user is intentionally deprived of real imagery.

To convey the display image from microprojector 16 to the first viewer optic 22 and second viewer optic 24, display system 10 includes redirection optic 26. The redirection optic is switchable electronically between first and second optical states, which govern the direction in which the display image is conveyed. In particular, the redirection optic is configured to receive the display image from the microprojector, to convey the display image, in the first optical state, to first viewer optic 22, and to convey the display image, in the second optical state, to second viewer optic 24. When conveying the display image to either of the first or second viewer optic, the other viewer optic does not receive the display image—or, received a negligible portion of the display light, relative to the viewer optic to which the display image is conveyed.

In some implementations, redirection optic 26, in conveying the display image to first viewer optic 22, reflects the display image; in conveying the display image to second viewer optic 24, the redirection optic transmits the display image. In other words, the first optical state of the redirection optic may be a reflective state, and the second optical state may be a transmissive state. In other implementations, redirection optic 26, in conveying the display image to first viewer optic 22, reflects the display image in a first direction; in conveying the display image to second viewer optic 24, the redirection optic reflects the display image in a second direction different from the first direction. In other words, both the first and second optical states of the redirection optic may be reflective states, which reflect in different directions.

Accordingly, the nature of redirection optic 26 may differ in the different implementations of this disclosure. In some implementations, the redirection optic includes a planar interface of one or more polarizable liquid-crystal domains and another refractive material. When the liquid crystal is polarized electrically, its refractive index changes relative to the other material. Accordingly, the planar interface may switch from being substantially reflective to being substantially transmissive with changing polarization applied via electronic controller 18. In other implementations, the redirection optic includes one or more plane mirrors coupled each to a small piezoelectric element(s). Here, the electronic controller may be configured to bias the piezoelectric element(s). In some implementations, the redirection optic may be a micromirror array.

The optical components described hereinabove are components of right-eye subsystem 14 of display system 10. The optical components of complementary left-eye subsystem 14'—microprojector 16', focusing lens 20', first viewer optic 22', second viewer optic 24', and redirection optic 26'—may be similar or identical to the corresponding components of the right-eye subsystem.

As noted above, electronic controller 18 not only controls the optical state of redirection optic 26, but also provides display-image data to microprojector 16 of right-eye subsystem 14. To this end, the electronic controller includes a logic machine 28 (e.g., one or more processor cores) operatively coupled to an electronic memory machine 30 (e.g., random-access memory). The logic machine may take the form of a microprocessor or graphical processing unit (GPU), for example. In some implementations, the logic machine and the electronic memory machine may be integrated, in whole or in part. Integrated forms may include a system-on-a-chip (SoC), for example. In the embodiment of FIG. 1, the electronic controller also provides display-image data to microprojector 16' of left-eye subsystem 14' and controls the optical state of redirection optic 26' of the left-eye subsystem. In other embodiments, each subsystem may have its own electronic controller. In either case, the display-image data provided to the right and left microprojectors need not be exactly the same, but may exhibit a controlled horizontal disparity in corresponding display features. In this manner, display system 10 may be configured for stereoscopic display of virtual, 3D imagery.

Continuing, now, in FIG. 1, electronic controller 18 may be configured to, during a first interval, switch and maintain redirection optic 26 in the first optical state and cause microprojector 16 to form the display image based on first image data. The electronic controller may be configured to, during a second interval, switch and maintain the redirection optic in the second optical state and cause the microprojector to form the display image based on second image data. Timing diagram 32 of FIG. 1 illustrates this feature.

The duration of the above first and second intervals will depend on the desired display frame rate of display system 10. In some implementations, the duration of each of the first and second interval is $1/(N*R)$, where R is the desired frame rate and N is the number of different fields-of-view serviced by the microprojector. With two fields-of-view and a desired frame rate of 60 per second, accordingly, each interval is 8.3 milliseconds. Unequal first and second intervals are also envisaged (vide infra).

In the particular embodiment of FIG. 1, first viewer optic 22 is aligned to a forward field-of-view of the user, and second viewer optic 24 is aligned to a peripheral field-of-view of the user. The first image data encodes display imagery to be presented in the forward field-of-view of the user's eye during the first interval, and the second image data encodes display imagery to be presented in the peripheral field-of-view of the same eye during the second interval. Taken together, the first and second image data encode display imagery of an extended field of view. It will be noted that the above first and second intervals need not be equal in every implementation. In some implementations, the duty cycle governing display in the forward viewer optic may be longer than the duty cycle governing display in the peripheral viewer optic. This is consistent with the closer attention the user is liable to give the forward display image relative to the peripheral and/or the expectation of a brighter forward image relative to the peripheral. It will be further noted that the terms 'forward' and 'peripheral' are relative terms, and, for the purpose of this disclosure, synonymous with 'first' and 'second' as used herein. The approach herein is compatible with distributing display imagery to first and second fields-of-view having any relative orientation, even two fields-of-view arranged directly along the optical axis of the wearer's eye.

In display system 10, peripheral display images are reflected into the second viewer optics via fold reflectors 34 and 34'. Additional focusing optics 36 and 36' are arranged optically downstream of each of the redirection optics. The additional focusing optics correct the ray vergence from microprojector 16 to account for the difference in optical path lengths to the first versus the second viewer optic.

FIG. 2 shows aspects of another wearable, near-eye, head-up display system 38. The display system of FIG. 2 is also applicable to stereoscopic display, but instead of having two, complementary microprojectors—one for each eye of the user—display system 38 uses only one.

In display system 38, first viewer optic 22 is a right viewer optic, and second viewer optic 24 is a left viewer optic. More specifically, the first viewer optic is aligned to a right eye 40 of the user, and the second viewer optic is aligned to the left eye 40' of the user. In this embodiment, the first and second image data provided to microprojector 16 by electronic controller 18 encode stereoscopic display imagery. More specifically, the first image data, provided for display during the first interval, is display-image data intended for the user's right eye; the second image data, provided for display during the second interval, is display-image data intended for the user's left eye. Timing diagram 42 of FIG. 2 illustrates this feature.

In the embodiment of FIG. 2, the optical path length measured from redirection optic 26 to first viewer optic 22 is substantially equal to the optical path length measured from redirection optic 26 to the second viewer optic 24. Equal path lengths ensure that the right and left display images are referenced to the same focal plane.

Display system 38 includes, in addition to fold reflectors 34 and 34', an adjustable fold reflector 34". The adjustable fold reflector is configured to reflect the display image en route to the left viewer optic. In some implementations, the position of one or more of redirection optic 26 and adjustable fold reflector 34" is adjustable. Adjustment of the position along the optical axis of microprojector 16 causes the display image to be shifted laterally in the right and/or left viewer optic, enabling adjustment of interpupilary distance in display system 38. This features makes the display system easily adaptable to users having different anatomical interpupilary distances.

Adjustable image alignment is advantageous for other reasons as well. In some embodiments, the display system includes a camera 44, facing outward so as to image the user's field-of-view. The camera gray be operatively coupled to electronic controller 18 and used for object recognition, facial recognition, simultaneous location and mapping (SLAM), etc. For these applications and others, it is advantageous for the field-of-view of the camera to be registered accurately to display-image mapping by rigid mechanical coupling of the camera and display optics to the device frame, for example. In implementations in which an inertial-measurement unit (IMU, e.g., a gyroscope/accelerometer/magnetometer) is used for SLAM, the IMU components also are rigidly coupled to the device frame. In the illustrated implementation, co-registration of the right and left displays, and registration relative to other device components, is further aided by use of a single microprojector 16, combined with simple lateral adjustment of the display images in the user's fields-of-view.

FIG. 3 shows aspects of another wearable, near-eye, head-up display system 46. Display system 46 uses a single microprojector for stereoscopic display (akin to the embodiment of FIG. 2) but also offers an extended field-of-view (akin to the embodiment of FIG. 1). Display system 46 and related embodiments include a plurality of redirection optics switchable electronically between first and second optical states and configured to receive a display image from microprojector 16. In these embodiments, at least one of the redirection optics is configured to convey the display image to another of the redirection optics.

In particular, display system 46 includes a right redirection optic 26 and a complementary left redirection optic 26'. The display system also includes a stereo redirection optic 26". Each of the redirection optics is switchable electronically between the first and second optical states, as described hereinabove. Stereo redirection optic 26" is configured to receive the display image from microprojector 16, to convey the display image, in the first optical state, to right redirection optic 26, and to convey the display image, in the second optical state, to left redirection optic 26'.

Electronic controller 18 of FIG. 3 is configured to, during the first and second intervals, switch and maintain stereo redirection optic 26" in the first optical state and cause microprojector 16 to form the display image based on right image data. Likewise, the electronic controller is configured to, during third and fourth intervals, switch and maintain the stereo redirection optic in the second optical state and cause the microprojector to form the display image based on left image data. Timing diagram 48 of FIG. 3 illustrates this feature. In the timing diagram, the symbol 'X' is used to indicate that the optical state of the associated redirection optic is irrelevant.

No aspect of the foregoing description should be interpreted in a limiting sense, for numerous variations and extensions are contemplated as well. For instance, although the drawings illustrate wearable, near-eye display embodiments, analogous fixed-reference head-up display systems (e.g., for automobiles) are also envisaged. In such embodiments, the first and second viewer optics may be much larger than shown in the drawings. In some examples, the 'extended field-of-view' concept may be extended to three or more fields-of-view, each having a dedicated viewer optic, but receiving display imagery from a single, multiplexed microprojector. In some examples, a plurality of abutting fields-of-view, all serviced by the same microprojector, may wrap around the user for a 360° effect. Furthermore, some of the optical arrangements described herein may be simplified for purposes of illustration. In some implementations, a given redirection optic, fold reflector, or other optical component may be replaced by two or more such components, and additional optics (filters, further folding, etc.) may be included as well. Conversely, first and second optics as described herein may, in some implementations, be first and second portions of the same optic (e.g., a waveguide with separate first and second entrance gratings).

One aspect of this disclosure is directed to a head-up display system comprising: a microprojector; first and second viewer optics; a redirection optic switchable electronically between first and second optical states, the redirection optic configured to receive a display image from the microprojector, to convey the display image, in the first optical state, to the first viewer optic, and to convey the display image, in the second optical state, to the second viewer optic; and an electronic controller configured to, during a first interval, switch and maintain the redirection optic in the first optical state and cause the microprojector to form the display image based on first image data, the electronic controller configured to, during a second interval, switch and maintain the redirection optic in the second optical state and cause the microprojector to form the display image based on second image data.

In some implementations, the first viewer optic is aligned to a right eye of a user, the second viewer optic is aligned to a left eye of the user, and the first and second image data encode stereoscopic display imagery. In some implementations, the first viewer optic is aligned to a forward field-of-view of a user, the second viewer optic is aligned to a peripheral field-of-view of the user, and the first and second image data encode display imagery of an extended field of view. In some implementations, a first optical path length from the redirection optic to the first viewer optic is substantially equal to a second optical path length from the redirection optic to the second viewer optic. In some implementations, the redirection optic includes a polarizable liquid crystal, and the electronic controller is configured to control polarization of the liquid crystal. In some implementations, the redirection optic includes a piezoelectric element, and the electronic controller is configured to bias the piezoelectric element. In some implementations, the redirection optic is a micromirror array. In some implementations, to convey the display image to the first viewer optic in the first optical state, the redirection optic reflects the display image, and to convey the display image to the second viewer optic in the second optical state, the redirection optic transmits the display image. In some implementations, to convey the display image to the first viewer optic in the first optical state, the redirection optic reflects the display image in a first direction, and to convey the display image to the second viewer optic in the second optical state, the redirection optic reflects the display image in a second direction different from the first direction. In some implementations, the microprojector includes a focusing lens. In some implementations, each of the first and second viewer optics is a pupil-expansion optic. In some implementations, each of the first and second viewer optics includes a waveguide. In some implementations, the microprojector is one or more of a liquid crystal, liquid-crystal-on-silicon, digital light processing, and organic light-emitting diode projector.

Another aspect of this disclosure directed to a stereoscopic head-up display system, comprising: a microprojector; a right, near-eye viewer optic; a left near-eye viewer optic; a redirection optic switchable electronically between first and second optical states, the redirection optic configured to receive a display image from the microprojector, to convey the display image, in the first optical state, to the right near-eye viewer optic, and to convey the display image, in the second optical state, to the left near-eye viewer optic; and an electronic controller configured to, during a first interval, switch and maintain the redirection optic in the first optical state and cause the microprojector to form the display image based on right-eye image data, the electronic controller configured to, during a second interval, switch and maintain the redirection optic in the second optical state and cause the microprojector to form the display image based on left-eye image data.

In some implementations, the display system further comprises a fold reflector configured to reflect the display image en route to the right near-eye viewer optic or the left near-eye viewer optic. In some implementations, a position of one or more of the redirection optic and the fold reflector is adjustable, and adjustment of the position causes the display image to be shifted laterally in the right near-eye viewer optic or the left near-eye viewer optic, enabling adjustment of interpupilary distance in the display system.

Another aspect of this disclosure is directed to a head-up display system comprising: a microprojector; a forward viewer optic; a peripheral viewer optic; a redirection optic switchable electronically between first and second optical states, the redirection optic configured to receive a display image from the microprojector, to convey the display image, in the first optical state, to the forward viewer optic, and to convey the display image, in the second optical state, to the peripheral viewer optic; and an electronic controller configured to, during a first interval, switch and maintain the redirection optic in the first optical state and cause the microprojector to form the display image based on forward image data, the electronic controller configured to, during a second interval, switch and maintain the redirection optic in the second optical state and cause the microprojector to form the display image based on peripheral image data.

In some implementations, the redirection optic is one of a plurality of redirection optics switchable electronically between first and second optical states and configured to receive the display image from the microprojector, and at least one of the redirection optics is configured to convey the display image to another of the redirection optics. In some implementations, the redirection optic is a right redirection optic, and the display system further comprises: a left redirection optic complementary to the right redirection optic; and a stereo redirection optic switchable electronically between first and second optical states, the stereo redirection optic configured to receive the display image from the microprojector, to convey the display image, in the first optical state, to the right redirection optic, and to convey the display image, in the second optical state, to the left redirection optic, the electronic controller further configured to, during the first and second intervals, switch and maintain the stereo redirection optic in the first optical state and cause the microprojector to form the display image based on right image data, the electronic controller further configured to, during third and fourth intervals, switch and maintain the stereo redirection optic in the second optical state and cause the microprojector to form the display image based on left image data. In some implementations, the display system further comprises a focusing optic arranged optically downstream of the redirection optic.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-up display system comprising:
   a microprojector;
   a first viewer optic;
   a second viewer optic fixed in position relative to the first viewer optic;
   a redirection optic switchable electronically between a transmissive first optical state and a reflective second optical state, the redirection optic being configured to receive a display image from the microprojector, to reflect the display image in the first optical state to the first viewer optic, and to transmit the display image in the second optical state to the second viewer optic;
   a fold reflector, wherein a position of one or more of the redirection optic and the fold reflector is adjustable parallel to an optical axis of the first and second viewer optics to cause the display image to be shifted laterally in the first viewer optic or the second viewer optic, thereby enabling adjustment of an interpupilary distance of the display system; and
   an electronic controller configured to, during a first interval, switch and maintain the redirection optic in the first optical state and cause the microprojector to form the display image based on first image data,
   the electronic controller configured to, during a second interval, switch and maintain the redirection optic in the second optical state and cause the microprojector to form the display image based on second image data.

2. The display system of claim 1 wherein the first viewer optic is aligned to a right eye of a user, wherein the second viewer optic is aligned to a left eye of the user.

3. The display system of claim 2 wherein the first and second image data encode stereoscopic display imagery.

4. The display system of claim 1 wherein a first optical path length from the redirection optic to the first viewer optic is substantially equal to a second optical path length from the redirection optic to the second viewer optic.

5. The display system of claim 1 wherein the redirection optic includes a polarizable liquid crystal, and wherein the electronic controller is configured to control polarization of the liquid crystal.

6. The display system of claim 1 wherein the redirection optic includes a piezoelectric element, and wherein the electronic controller is configured to bias the piezoelectric element.

7. The display system of claim 1 wherein the redirection optic is a micromirror array.

8. The display system of claim 1 wherein the microprojector includes a focusing lens.

9. The display system of claim 1 wherein each of the first and second viewer optics is a pupil-expansion optic.

10. The display system of claim 1 wherein each of the first and second viewer optics includes a waveguide.

11. The display system of claim 1 wherein the microprojector is one or more of a liquid crystal, liquid-crystal-on-silicon, digital light processing, and organic light-emitting diode projector.

12. A stereoscopic head-up display system, comprising:
    a microprojector operatively coupled to a stereo redirection optic, to a right redirection optic, and to a left redirection optic;
    a right-forward near-eye viewer optic and a right-peripheral near-eye viewer optic;
    a left-forward near-eye viewer optic and a left-peripheral near-eye viewer optic,
    the stereo redirection optic being switchable electronically between first and second optical states and configured to receive a display image from the microprojector, to convey the display image, in the first optical state, to the right redirection optic, and to convey the display image, in the second optical state, to the left redirection optic,
    the right redirection optic being switchable electronically between the first and second optical states and configured to receive the display image from the stereo redirection optic, to convey the display image, in one of the first and second optical states, to the right-forward viewer optic, and to convey the display image, in another of the first and second optical states, to the right-peripheral viewer optic,
    the left redirection optic being switchable electronically between the first and second optical states and configured to receive the display image from the stereo redirection optic, to convey the display image, in one of the first and second optical states, to the left-forward viewer optic, and to convey the display image, in another of the first and second optical states, to the left-peripheral viewer optic; and
    an electronic controller configured to switch one or more of the stereo redirection optic, the right redirection optic, and the left redirection optic between the first and second optical states and synchronously cause the microprojector to form the display image based successively on right-forward, right-peripheral, left-forward, and left-peripheral image data.

13. The display system of claim 12 further comprising a fold reflector configured to reflect the display image en route to the right-forward near-eye viewer optic or the left near-eye viewer optic.

14. The display system of claim 12 further comprising a fold reflector, wherein a position of one or more of the redirection optic and the fold reflector is adjustable, and wherein adjustment of the position causes the display image to be shifted laterally in the right-forward near-eye viewer optic or the left near-eye viewer optic, thereby enabling adjustment of an interpupilary distance in the display system.

15. A head-up display system comprising:
    a microprojector;
    a forward viewer optic aligned to a forward field of view of a right eye of a user;
    a peripheral viewer optic aligned to a peripheral field of view of the right eye of the user;
    a redirection optic switchable electronically between first and second optical states, the redirection optic configured to receive a display image from the microprojector, to convey the display image, in the first optical state, to the forward viewer optic, and to convey the display image, in the second optical state, to the peripheral viewer optic; and
    an electronic controller configured to, during a first interval, switch and maintain the redirection optic in the first optical state and cause the microprojector to form the display image based on forward image data, the electronic controller configured to, during a second interval, switch and maintain the redirection optic in the second optical state and cause the microprojector to form the display image based on peripheral image data.

16. The display system of claim 15 wherein to convey the display image to the first viewer optic in the first optical state, the redirection optic reflects the display image, and to convey the display image to the second viewer optic in the second optical state, the redirection optic transmits the display image.

17. The display system of claim 15 wherein to convey the display image to the first viewer optic in the first optical state, the redirection optic reflects the display image in a first direction, and to convey the display image to the second viewer optic in the second optical state, the redirection optic reflects the display image in a second direction different from the first direction.

18. The display system of claim 15 wherein the redirection optic is one of a plurality of redirection optics switchable electronically between first and second optical states and configured to receive the display image from the microprojector, and wherein at least one of the redirection optics is configured to convey the display image to another of the redirection optics.

19. The display system of claim 15 wherein the redirection optic is a right redirection optic, the display system further comprising:

a left redirection optic complementary to the right redirection optic; and a stereo redirection optic switchable electronically between first and second optical states, the stereo redirection optic configured to receive the display image from the microprojector, to convey the display image, in the first optical state, to the right redirection optic, and to convey the display image, in the second optical state, to the left redirection optic, the electronic controller further configured to, during the first and second intervals, switch and maintain the stereo redirection optic in the first optical state and cause the microprojector to form the display image based on right image data, the electronic controller further configured to, during third and fourth intervals, switch and maintain the stereo redirection optic in the second optical state and cause the microprojector to form the display image based on left image data.

20. The display system of claim 15 further comprising a focusing optic arranged optically downstream of the redirection optic, wherein the focusing optic is configured to correct a ray vergence from the microprojector to account for a difference in optical path between forward and peripheral fields of view.

* * * * *